United States Patent
Gregor

(10) Patent No.: US 7,261,349 B1
(45) Date of Patent: Aug. 28, 2007

(54) PICK-UP TOOL WITH REPLACEABLE CENTER STRAP

(76) Inventor: Theodore J. Gregor, 1444 Pioneer Way, Ste. 13, El Cajon, CA (US) 92020

( * ) Notice: Subject to any disclaimer, the term of this patent is extended or adjusted under 35 U.S.C. 154(b) by 6 days.

(21) Appl. No.: 10/973,512

(22) Filed: Oct. 26, 2004

Related U.S. Application Data

(63) Continuation of application No. 10/254,419, filed on Sep. 25, 2002, now abandoned.

(51) Int. Cl.
*B25J 1/00* (2006.01)
(52) U.S. Cl. .................................. 294/19.1; 294/100
(58) Field of Classification Search ................ 294/8.5, 294/11, 19.1–19.3, 22, 23, 24, 50.8, 100, 294/115; 81/53.11, 53.12
See application file for complete search history.

(56) References Cited

U.S. PATENT DOCUMENTS

| | | | | |
|---|---|---|---|---|
| 302,924 A | * | 8/1884 | McMillen | .................. 294/19.1 |
| 4,210,353 A | * | 7/1980 | Koontz | ....................... 294/19.1 |
| 4,962,957 A | * | 10/1990 | Traber | ........................ 294/19.1 |
| 5,458,385 A | * | 10/1995 | Peeples | ...................... 294/19.1 |
| 5,577,785 A | * | 11/1996 | Traber et al. | ............... 294/19.1 |
| 5,704,674 A | * | 1/1998 | Boozer | ....................... 294/65.5 |

* cited by examiner

*Primary Examiner*—Dean J. Kramer
(74) *Attorney, Agent, or Firm*—James C. Weseman

(57) ABSTRACT

A hand actuated pick-up tool including an elongated hollow shaft having distal and proximal ends; first and second flexible grip members at the distal end of the hollow shaft for grasping an object; a center strap extending from the grip members interiorly within the shaft; and a handle located on the proximal end of the shaft. The handle includes a trigger mechanism for drawing the center strap rearward in order to actuate the grip members, where the trigger device includes a channel for receiving and releasably retaining the center strap. The center strap is detachable from the trigger mechanism, and the handle includes an aperture allowing access to the trigger device channel and the center strap, and enabling the center strap to be inserted and withdrawn through the aperture, permitting replacement of the center strap.

6 Claims, 8 Drawing Sheets

PICK-UP TOOL WITH REPLACEABLE CENTER STRAP

RELATED APPLICATION DATA

This application is a continuation of U.S. application Ser. No. 10/254,419 filed Sep. 25, 2002, now abandoned.

TECHNICAL FIELD

The present invention relates to hand-actuated pick-up tools, and, more particularly, to hand-actuated pick-up tools with yieldable grip members.

BACKGROUND OF THE INVENTION

A hand-actuated pick-up tool that includes certain features of the present invention was first described and patented in U.S. Pat. No. 3,527,492. Similar tools remain in production, and are popularly known by the name "EZ Reacher." Because of its yieldable grip, the tool is sufficiently sensitive to enable the user to pick up a needle, yet it is strong enough to allow the user to lift a five-pound weight. The pick-up tool, therefore, has a wide range of applications and enjoys great commercial success in diverse markets.

A subsequent but similar pick-up tool is described in U.S. Pat. No. 5,577,785, which teaches that the center stalk of the tool is made of lightweight aluminum; its handle is formed from strong injection molded plastic and the fingers, center straps, referred to in prior art as ribbons, and fittings are made of first class stainless steel. In the medical market, the later pick-up tool serves the needs of those requiring aid in reaching and gathering objects of all types. The greatest commercial success of the patented pick-up tool is in the industrial market place, which includes grounds maintenance, the removal of trash, litter and unsanitary debris from restrooms, parks and roadways.

However, when used in such heavy-duty applications, the center straps or ribbons of the prior art pick-up tool often become bent, mangled and broken. With bent or mangled center straps, the usefulness of the pick-up tool is seriously diminished. With even one broken strap, the pick-up tool of the prior art is rendered useless. No other component of this tool is particularly prone to failure.

The present handle design and methods of assembly of such prior art pick-up tools make it virtually impossible to replace the center straps and restore the function of the tool. Regarding assembly of the prior art tool, U.S. Pat. No. 5,577,785 teaches, in part, that many screws and rivets are used to hold the components together. Each component must be drilled for these fasteners and each fastener must be driven into its base to obtain assembly of the requisite parts. The center straps are bolted to the trigger requiring a separate assembly operation. Practical experience teaches that any attempt to disassemble the tool for the purpose of replacing the center straps is likely to cause irreparable damage to the injection molded handle. Consequently, tens of thousands of such tools are discarded annually. This economic waste could be avoided if the damaged center straps could be easily replaced.

Therefore, it is the principal object of this invention to provide a yieldable-grip pick-up tool with center straps that can be replaced in a convenient manner without requiring the use of tools or a separate assembly operation.

DISCLOSURE OF THE INVENTION

The present invention provides a hand actuated pick-up tool, comprising an elongated hollow shaft terminating at spaced-apart distal and proximal ends; first and second flexible grip members extending divergently outward from the distal end of the hollow shaft and including flexible elements terminating the outer ends of the grip members for grasping an object when the grip members are brought toward one another; a center strap extending from the first grip member interiorly within the shaft and then back interiorly to the second grip member; and a handle formed in cooperation with the hollow shaft and located on the proximal end thereof, the handle including distal and proximal ends and having the distal end thereof mounted to the proximal end of the hollow shaft.

In the present invention the handle comprises a trigger device for drawing the center strap rearward in order to actuate the grip members, where the trigger device includes a channel for receiving and releasably retaining the center strap together with means for detaching the end of the center strap from the trigger device, and an aperture in the handle allowing access to the trigger device channel and the center strap, and means for inserting and withdrawing the center strap through the aperture. The invention thus permits replacement of the center strap.

The present invention achieves the above object and solves the aforementioned problems of the prior art in that it is a yieldable grip tool with replaceable, quick change center straps that can be conveniently installed without a separate assembly operation and without tools. Alternately the bound center straps could be sold separately to retrofit existing tools.

The objects of the invention will become more apparent by reading the following Detailed Description of the Invention taken together with the drawings that are appended hereto.

DETAILED DESCRIPTION OF THE INVENTION

The present invention provides a hand actuated pick-up tool, comprising an elongated hollow shaft terminating at spaced-apart distal and proximal ends; first and second flexible grip members extending divergently outward from the distal end of the hollow shaft and including flexible elements terminating the outer ends of the grip members for grasping an object when the grip members are brought toward one another; a center strap extending from the first grip member interiorly within the shaft and then back interiorly to the second grip member; and a handle formed in cooperation with the hollow shaft and located on the proximal end thereof, the handle including distal and proximal ends and having the distal end thereof mounted to the proximal end of the hollow shaft.

In the present invention the handle comprises a trigger device for drawing the center strap rearward in order to actuate the grip members, where the trigger device includes a channel for receiving and releasably retaining the center strap together with means for detaching the end of the center strap from the trigger device, and an aperture in the handle allowing access to the trigger device channel and the center strap, and means for inserting and withdrawing the center strap through the aperture. The invention thus permits replacement of the center strap.

Figure 1:
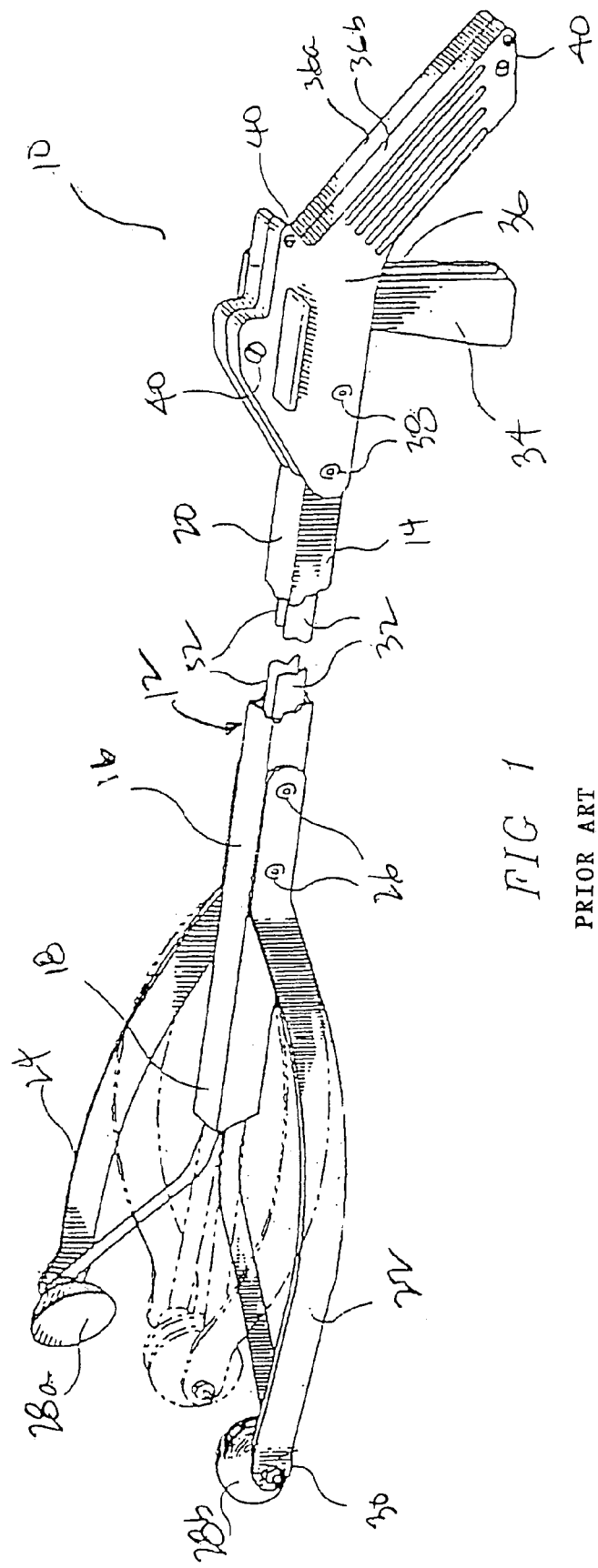
FIG. 1 is a three dimensional, perspective view of a pick-up tool of the prior art.

Turning now to the drawings, where like elements are identified by like numerals throughout the figures, FIG. 1 shows a tool 10 of the prior art having an elongated shaft 12, made up of a pair of spaced apart wide side walls 14 and a pair of spaced apart narrower end walls 16 attached together along their respective side edges to form a rectangular, cross sectional hollow member made of thin-walled, extruded aluminum terminated at spaced-apart distal and proximal ends 18 and 20, respectively. First and second short, flexible, spring pick-up fingers 22 and 24 are attached at their proximal ends to the outside of shaft 12 by rivets 26 and are attached to flexible elements or cups 28a and 28b at their distal ends by post and nut combination 30.

A center strap paired assembly 32 extends from each cup 28a, 28b through the interior of shaft 12 to a trigger 34 that is pivotally mounted at shaft proximal end 20 and is adapted to pull center strap 32 rearward when squeezed as part of a handle 36 formed thereabout at shaft proximal end 20. The rearward pull of center strap 32 causes cups 28a and 28b to come together for grasping an object by flexing and bending pick-up fingers 22 and 24 toward each other (as depicted in FIG. 1 in phantom line). The handle 36 of pick-up tool 10 is made up of two injection-molded, half-handles 36a and 36b that are attached together and to shaft 12 by numerous rivets 38 and screws 40.

Figure 2:
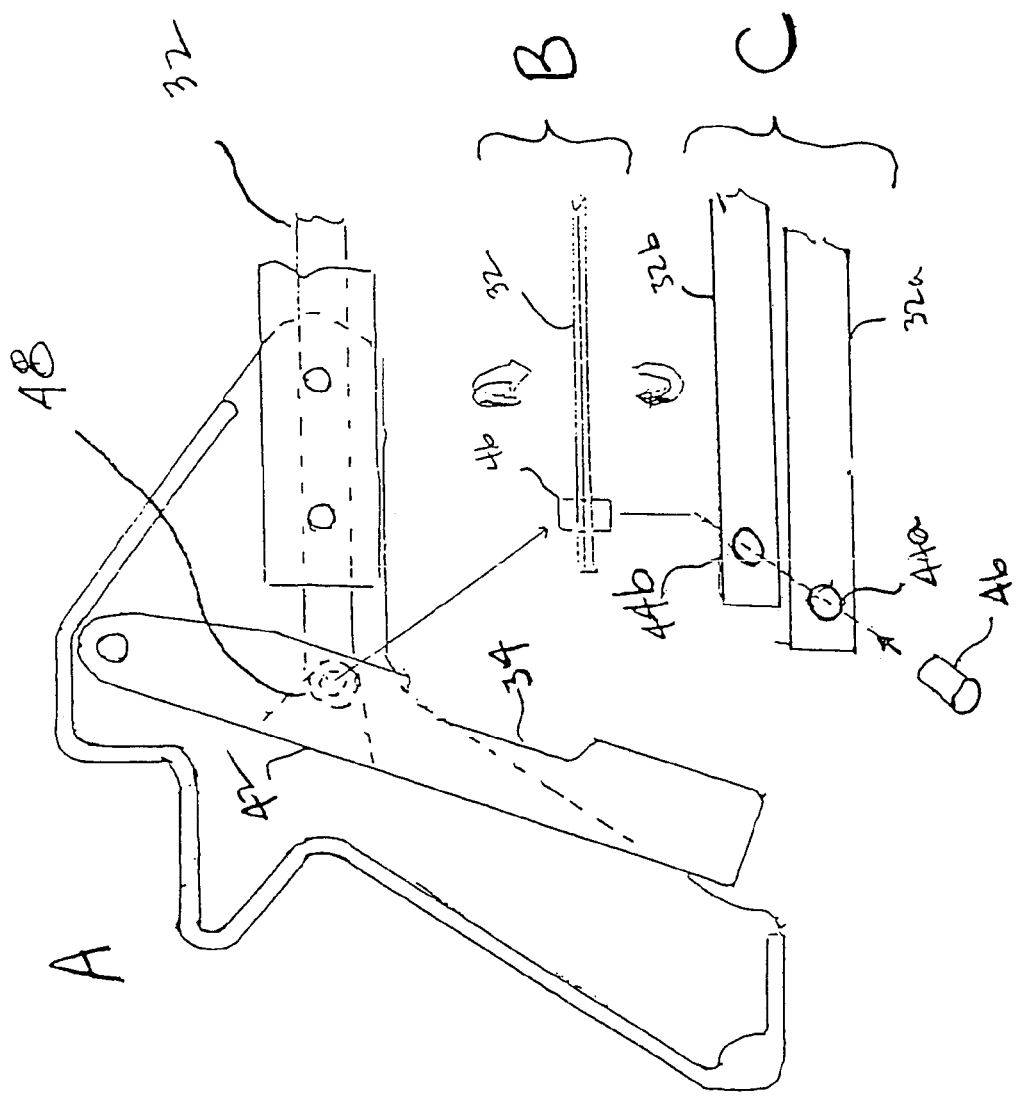
FIG. 2 panel A is a horizontal elevation cross-sectional view (with panel B depicting a top plan view) of the handle of the prior art tool of FIG. 1, detailing the friction fit of the center strap into the trigger and panel C depicting exploded detail.

In the prior art pick-up tool, as shown in FIG. 2, the individual bands (32a, 32b) of center strap 32 are not bound together at the proximal end where fitted into the trigger 34. Rather, they are separately inserted into the distal end of the trigger assembly and allowed to protrude through the proximal end of the trigger slot 42. FIG. 2, panel C shows that holes 44a and 44b are aligned using a metal alignment pin 46 to form the assembly depicted in panel B. Then, the proximal end of the center strap 32 is forced into place 48 in the trigger 34 utilizing a specialized ram tool, thus locking the center strap 32 into place with an tight fit between the walls of the trigger 34 and the ends of the alignment pin 46. FIG. 2, panel A shows the final position of the prior art center strap 32 and the metal alignment pin 46 after they have been "rammed" into position. This prior art method of assembly effectively precludes replacement of the center strap 32 after final assembly of the pick-up tool.

Embodiments of the pick-up tool device 100, 200 of the present invention are presented in detail in FIGS. 3–9, which shows a similar hollow shaft 102, typically constructed of side walls 104 and end walls 106, and with a typically rectangular shaft cross-section as depicted in FIG. 1, although any of numerous cross-sectional configurations and construction techniques are possible. Similarly, the present shaft 102 is terminated by a distal end 108 and a proximal end 110. A pair of flexible grip members 112 and 114 extend from shaft distal end 108, convex to each other, and are likewise attached at their proximal ends (defined with reference to shaft 102) to the outside of shaft 102, optionally by rivets, or can be attached to the inside of the shaft, as depicted in U.S. Pat. No. 5,577,785, and are attached at their distal ends to flexible elements or cups 118a and 118b, optionally by a similar post and nut combination 120.

Again, analogous to the prior art tool, center strap 122 (comprising bands 122a, 122b and likewise having distal and proximal ends defined with reference to shaft 102) extends from each cup 118a, 118b through the interior of shaft 102 to a trigger device 124, 224 that is pivotally mounted either to the handle 126, 226 or the shaft 102 at the shaft proximal end 110. Typically, center strap 122 is also constructed of a flexible material, although a pick-up tool with a relatively rigid center strap can readily find use in the present invention.

Figure 8:
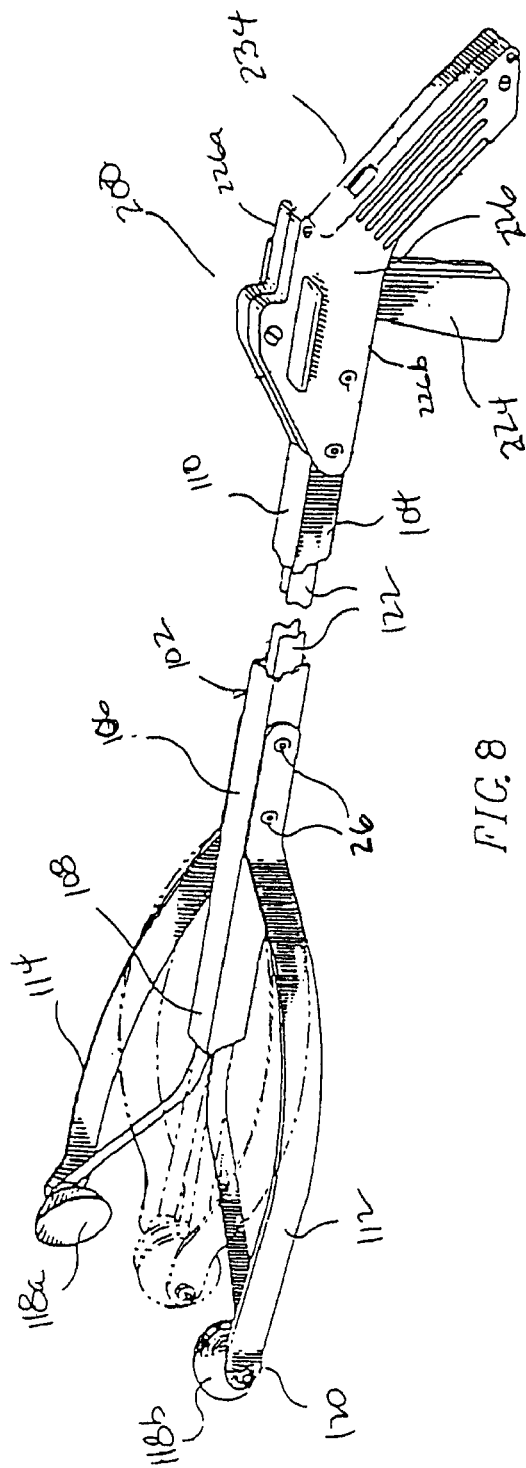
FIG. 8 is a three dimensional, perspective view of a tool of the present invention showing an embodiment of the aperture in the tool handle.

Trigger 124, 224 is adapted to pull center strap 122 rearward when the trigger is squeezed, ordinarily as a part of handle 126, 226 (likewise having distal and proximal ends defined with reference to shaft 102) formed thereabout at shaft proximal end 110. The rearward pull by trigger 124, 224 attached to the proximal end of center strap 122 actuates grip members 112 and 114 and causes cups 118a and 118b to come together for grasping an object by flexing and bending grip members 112 and 114 toward each other (as depicted in FIG. 8 in phantom line).

Figure 3:
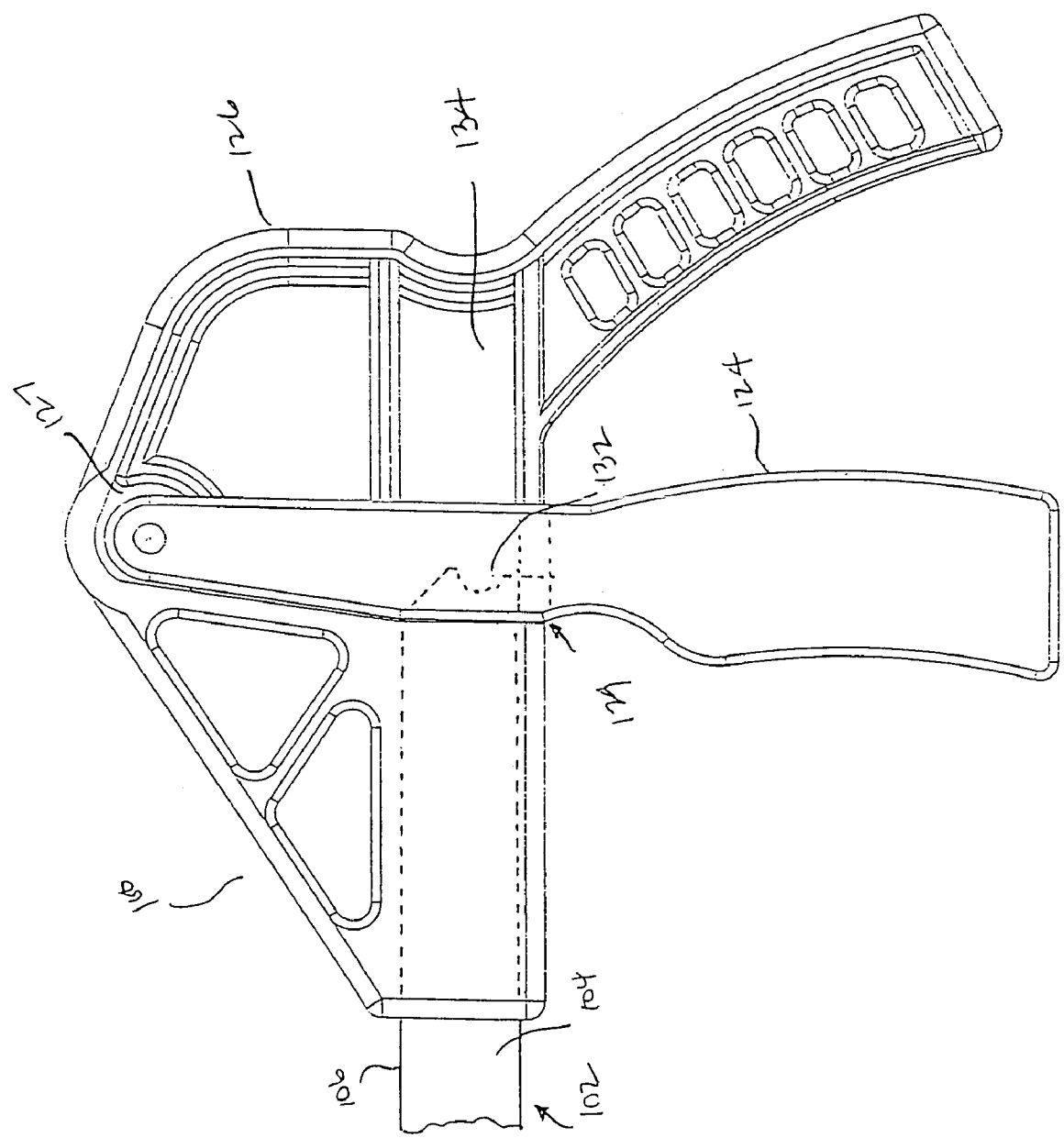
FIG. 3 is a horizontal elevation cross-sectional view of one embodiment of a handle assembly of the present invention, showing the juxtaposition of the handle aperture with the channel in the trigger and the continuation of the alignment of the channel into the hollow interior of the elongated shaft of the tool.
Figure 4:
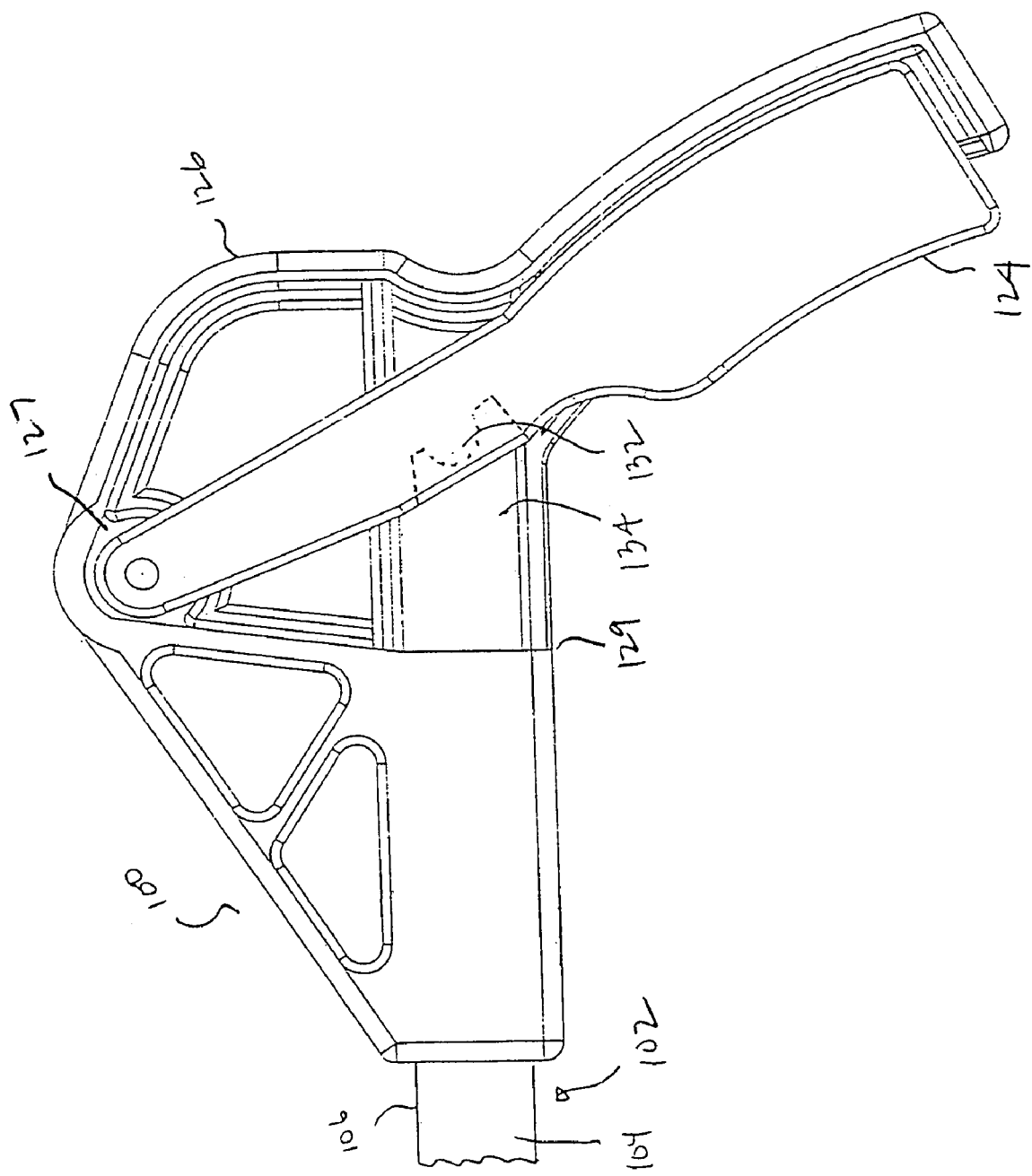
FIG. 4 is a horizontal elevation cross-sectional view of the embodiment of FIG. 3, showing the channel in the trigger where the trigger has been retracted toward the proximal end of the handle.

As shown in FIGS. 3 and 4, and again in FIGS. 5–9, there are many embodiments of pick-up tool handles and triggers that can incorporate the desirable features of the present invention. For example, FIGS. 3 and 4 depict handle 126 molded as a monolithic device incorporating a mounting platform 127 for pivotal mounting of trigger 124 and including aperture 134 as a recess molded into the side of handle 126. In a handle 126 of this configuration, it will be desirable to provide a relieved configuration or a guard in the region 129 in order to reduce the risk that the user's fingers would be pinched between the trigger 124 and the handle 126 when the pressure on the trigger is released.

FIG. 3 shows the alignment of the aperture 134 with the channel 132 in the trigger 124 leading to the hollow interior of the elongated shaft 102 of the present pick-up tool device 100. The off-center alignment of the aperture 134 and the channel 132 utilizes the flexibility of a bound center strap 122 to enable it to be inserted into aperture 134, after which it will pass through the channel in trigger 124 then through shaft 102 where the separate bands will be attached to grip members 112, 114 at the distal end 108 of the shaft 102. This technique can be used in the initial assembly of the tool 100 as well as in the replacement of center strap 122.

Figure 5:
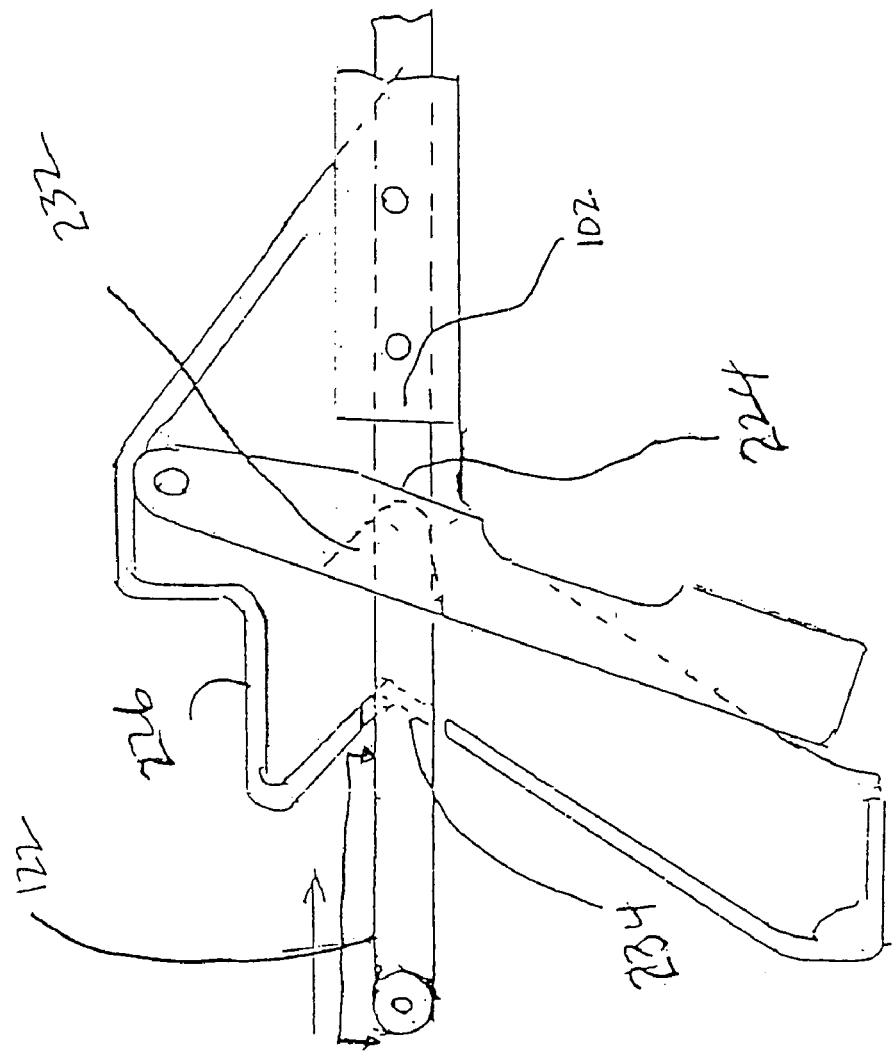
FIG. 5 is a horizontal elevation cross-sectional view of an alternative embodiment of the present invention, showing the alignment of the handle aperture with a channel in the trigger and the continuation of the same alignment into the hollow interior of the shaft of the tool.
Figure 7:
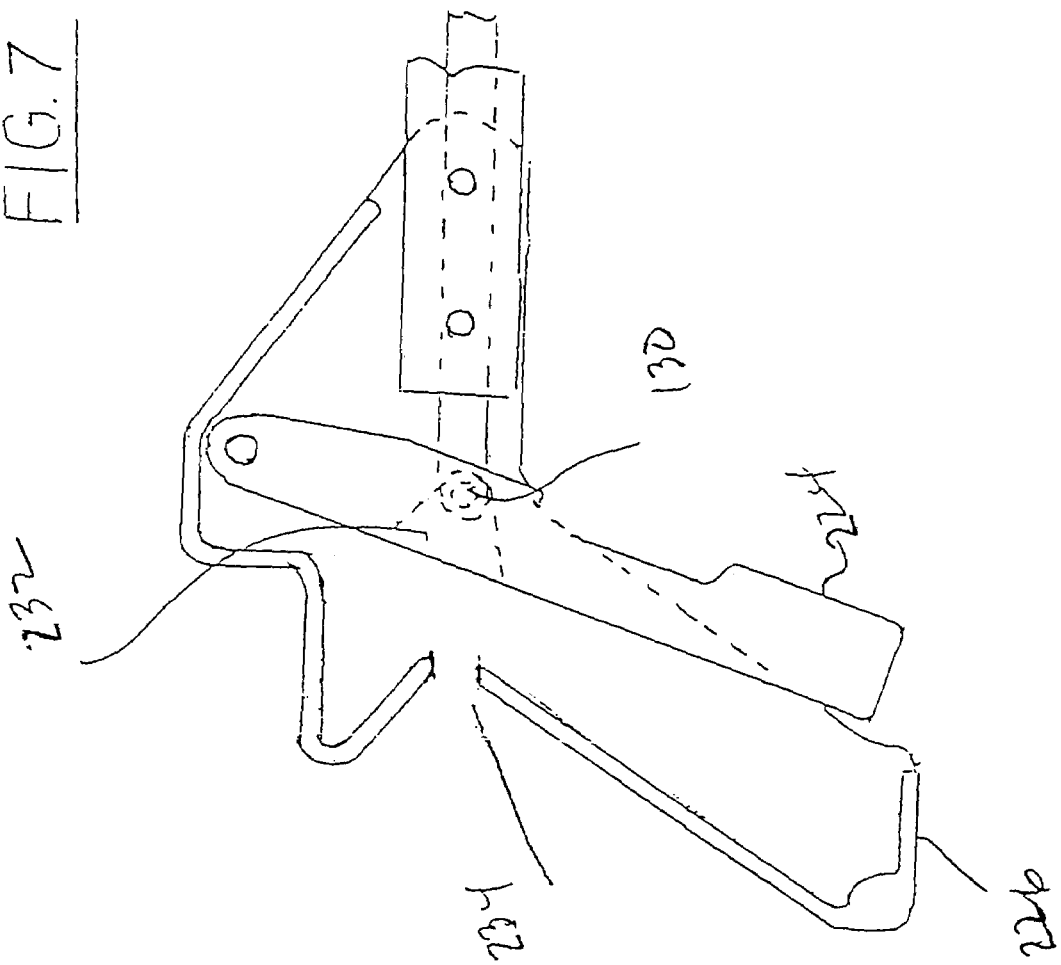
FIG. 7 is a horizontal elevation cross-sectional view of the embodiment of FIG. 5 with the bound center strap fitted into position in the trigger after the center strap has been inserted through the aperture in the handle and into the interior of the elongated shaft.

As shown in FIGS. 5 and 7, pick-up tool 200 can be assembled utilizing a handle 226 and trigger 224 which are based on prior art handles and triggers, but which incorporate trigger channel 232 and aperture 234 of the present invention, to receive and releasably retain the center strap 122 assembly of the invention. Handle 226 can also be molded as a monolithic device, or can be constructed of two half-handles 226a, 226b, or other multi-element devices, that are assembled together and attached to shaft 102 by any desired means.

FIG. 5 shows the alignment of aperture 234 with channel 232 in trigger 224 leading directly to the hollow interior of the elongated shaft 102 of the present pick-up tool device 200. Whether flexible or substantially rigid, bound center strap 122 can be inserted into aperture 234 after which it will pass through channel 232 in trigger 224 then through shaft 102 where the separate bands will likewise be attached to grip members 112, 114 at the distal end 108 of the shaft 102. This technique can be used in the initial assembly of the tool 200 as well as in the replacement of center strap 122.

Figure 9:
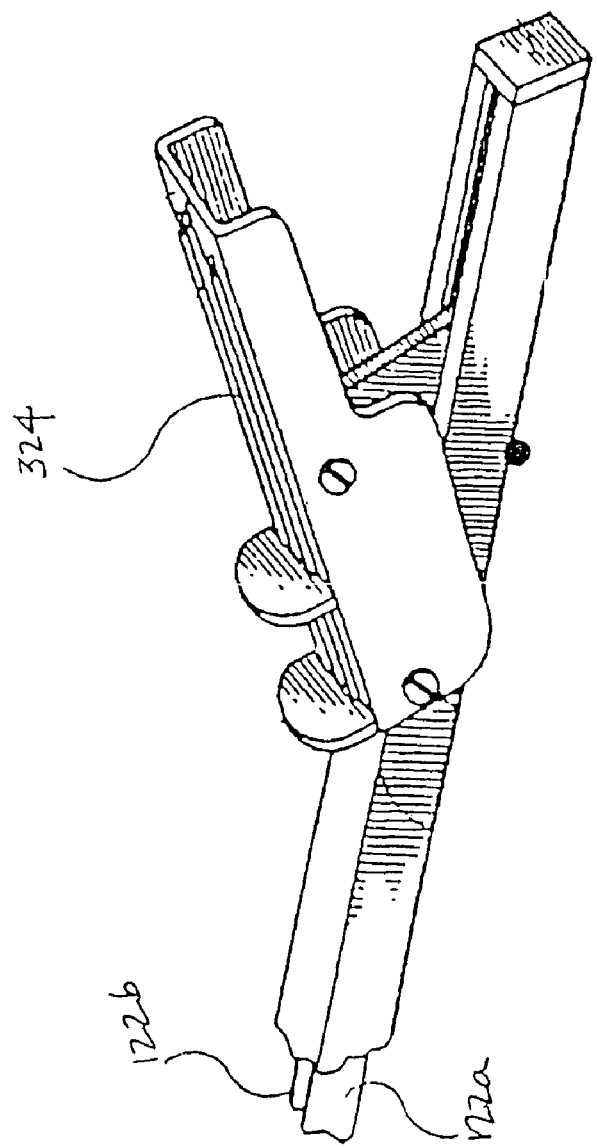
FIG. 9 is a three dimensional, perspective view of a handle of the prior art, which can readily be adapted to incorporate the trigger channel of the present invention.

Furthermore, FIG. 9 depicts a pick-up tool handle of the prior art, which by its open-ended design would provide the access feature of aperture 134, 234 and allow insertion of center strap 122 into trigger 324 having a channel (not shown, but similar to channel 132, 232) that is capable of receiving and releasably retaining the center strap 122 in accordance with the present invention.

Additional handle and trigger embodiments of the invention are well within the skill of an ordinary artisan, having the present specification for guidance. For example, it is also readily apparent that a handle analogous to that in the embodiment depicted in FIGS. 3 and 4 can be constructed with the aperture formed in the proximal end on the handle, similarly to the aperture depicted in FIGS. 5, 7 and 8. In addition, if desired for aesthetic reasons, the aperture of the present invention can be covered by a decorative plug, which might also serve to reduce the ingress of moisture and dirt into the inner portions of the mechanism.

Figure 6:
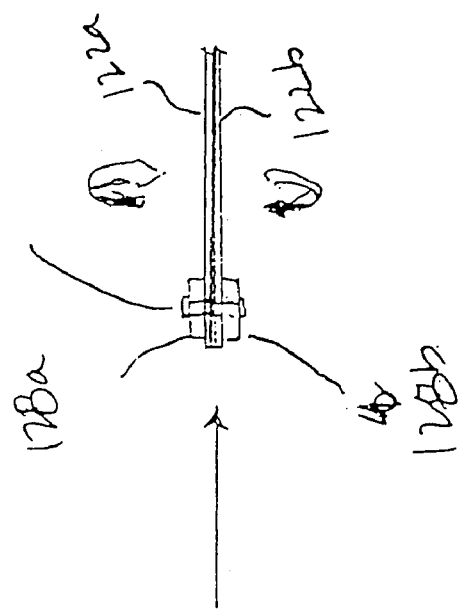
FIG. 6 depicts a top plan view of the binding of the trigger end of the center strap of the present invention in the embodiment of FIG. 5.

FIG. 6 depicts the assembly of the proximal end of one embodiment of the center strap 122 of the present invention. As shown, back-up washers 128a, 128b are placed on either side of the bands of center strap 122 and secured thereto by, e.g. a pop rivet 130. Thus bound, the center strap 122 can be inserted into the channel 132, 232 in trigger 124, 224 where the center strap 122 will fit into place with a mild interference fit. The "V" or "U" shape of the recess 132, 232 in trigger 124, 224 as shown in the Figures, coupled with the uniform diameter of the back-up washers 128a, 128b will provide consistent positioning of the center strap 122. In addition, the attachment of the bands of center strap 122 to grip members 112, 114 provides alignment and retention of center strap 122 in its desired position. This consistent placement will insure proper closure of the grip members 112, 114 after the bands of center strap 122 have been attached to the grip members 112, 114 of the present pick-up tool 100, 200. Furthermore, the attachment of the distal ends of the bands of center strap 122 to the grip members 112, 114 will immobilize the interference fit and allow it to function just as the above described, prior art, friction fit shown in FIG. 2. The position of the back-up washers 128a, 128b and the interference fit of the present center strap 122 is shown in FIG. 7. Note that this position in the present device is essentially identical to the position of the pin in the friction fit shown in FIG. 2 of the prior art tool 10.

It is also readily apparent that center strap 122 can readily be constructed in numerous alternative configurations, and using alternative binding mechanisms, while preserving the benefits of the present invention. In addition, it is also apparent that the center strap 122 could be provided in unitary construction, rather than as separate bands bound together, and continue to serve the function of the center strap described herein.

Fixed as described above and as pictured in FIG. 6, center strap 122 can be easily installed in the original manufacture of the prior art pick-up tool, with straightforward modification. In addition, it can readily be envisioned that the features of the present invention can be retrofitted to the prior art tools, although the cost efficiency of such modifications will need to be established in a particular application.

Importantly, when used in conjunction with aperture 234 in the proximal end of pick-up tool device handle 226 shown in FIG. 5, FIG. 7, and FIG. 8, the present invention solves the problems of the prior art in that damaged or broken center straps can be changed quickly and conveniently without complete disassembly of the pick-up tool and without specialized tools or equipment.

This simple procedure can be used to replace center straps after assembly has been completed and after said straps have become damaged or broken during use of the present pick-up tool device.

All patents and patent applications cited in this specification are hereby incorporated by reference as if they had been specifically and individually indicated to be incorporated by reference. Although the foregoing invention has been described in some detail by way of illustration and Example for purposes of clarity and understanding, it will be apparent to those of ordinary skill in the art in light of the disclosure that certain changes and modifications may be made thereto without departing from the spirit or scope of the appended claims.

The invention claimed is:

1. A hand actuated pick-up tool, comprising:
    a) an elongated hollow shaft terminating at spaced-apart distal and proximal ends;
    b) first and second flexible grip members extending divergently outward from said distal end of said hollow shaft and including flexible elements terminating the outer ends of said grip members for grasping an object when said grip members are brought toward one another;
    c) a center strap extending from said first grip member interiorly within said shaft and then back interiorly to said second grip member and
    d) a handle formed in cooperation with said hollow shaft located on the proximal end thereof, said handle including distal and proximal ends and having the distal end thereof mounted to the proximal end of the hollow shaft and said handle comprising
       i) a trigger device for drawing the center strap rearward in order to actuate the grip members, said trigger device including a channel for receiving and releasably retaining said center strap together with means for detaching the end of the center strap from the trigger device without dismantling the handle, and
       ii) an aperture in the handle allowing access to the trigger device channel and the center strap, and providing access for inserting and withdrawing the center strap through the aperture;
    thereby permitting replacement of the center strap by drawing the center strap rearward through the aperture without dismantling the handle.

2. The pick-up tool of claim 1, wherein the trigger device channel is not aligned with the aperture in the handle.

3. The pick-up tool of claim 1, wherein the trigger device channel is aligned with the aperture in the handle.

4. The pick-up tool of claim 1, wherein the means for detaching the center strap from the trigger device comprises an interference fit between the center strap and the trigger device channel.

5. The pick-up tool of claim 1, wherein the trigger device channel is an elongated slot.

6. The pick-up tool of claim 1, wherein the aperture is an elongated slot.

* * * * *